United States Patent [19]

Chen et al.

[11] Patent Number: 5,557,746

[45] Date of Patent: Sep. 17, 1996

[54] SYSTEM AND METHOD FOR RECORDING ACCOUNTING TIMES

[75] Inventors: David D. Chen, Cary; John L. Eisenbies, Raleigh; William F. McKenzie, Jr., Raleigh; Leo Temoshenko, Raleigh, all of N.C.

[73] Assignee: International Business Machines Corporation, Armonk, N.Y.

[21] Appl. No.: 123,547

[22] Filed: Sep. 20, 1993

[51] Int. Cl.$^6$ ..................................................... G06F 15/00
[52] U.S. Cl. ................ 395/200.06; 364/222; 364/225.1; 364/249.94; 364/282.1; 364/284.4; 364/DIG. 1
[58] Field of Search ................................ 395/200, 200.06; 364/464.01, 464.04; 464/467

[56]  References Cited

U.S. PATENT DOCUMENTS

| | | | |
|---|---|---|---|
| 4,355,361 | 10/1982 | Riggs et al. | 364/464 |
| 5,003,520 | 3/1991 | Grieu et al. | 368/90 |
| 5,237,507 | 8/1993 | Chasek | 364/464.04 |
| 5,239,576 | 8/1993 | Yoshida et al. | 379/355 |

Primary Examiner—Kevin J. Teska
Assistant Examiner—Ayni Mohamed
Attorney, Agent, or Firm—Stephen T. Keohane

[57]  ABSTRACT

A system and method for recording accounting times by an Agent in a network and retrieving the accounting times by the network Manager. Three types of data objects in each of the Agent's stored records are provided. Record Number is the sequence number of the record in the file. Recording time is an indication of the time the record was stored in the file since a certain point in time, such as after the Agent's clock began running. Record Type is the particular type of record stored. The Record Type can either be DATA representing normal accounting data or TIME representing time data used for correlating the Manager's and the Agent's time-keeping. Upon receipt of an accounting data record of type DATA, the manager uses the record's Recording time to help determine the point of time accorded to that event. The Manager then uses the previous record of type TIME to adjust the Recording time of the received accounting data record relative to the Manager's precise calendar time.

23 Claims, 7 Drawing Sheets

TG = Transmission Group

| | |
|---|---|
| Common Attributes | RecordNumber --- 000000 |
| | Record Type --- TIME |
| | RecordingTime --- 0000021 |
| Other Attributes | Record Sub Types: |
| | RecordEvent --- Accounting Started |
| | Unit of TimeTick --- hundredths of a second |
| Agent Name and Time | AgentName --- AGENT_NAME1 |
| | Agent Seconds --- 3 |
| | Agent Minutes --- 30 |
| | Agent Hours --- 5 |
| | AgentMonthDays --- 12 |
| | AgentMonths --- 01 |
| | Agent Years --- 1993 |
| | AgentTimeZone --- CST U.S. |
| Manager Name and Time | ManagerName --- MANAGER_NAME1 |
| | ManagerSeconds --- 12 |
| | ManagerMinutes --- 30 |
| | ManagerHours --- 6 |
| | ManagerMonthDays --- 12 |
| | ManagerMonths --- 01 |
| | ManagerYears --- 1993 |
| | ManagerTimeZone --- EST U.S. |
| | ManagerTimeValid --- YES |

FIG. 2

SYSTEM AND METHOD FOR RECORDING ACCOUNTING TIMES

BACKGROUND OF THE INVENTION

1. Field of the Invention

The present invention relates to network management and, more particularly, to a system and method for recording accounting times by an Agent in a network and their retrieval by the network Manager so that accurate time accounting is maintained when prior art time accounting systems and methods have failed.

2. Background and Prior Art

Data communication has become a fundamental part of computing. World-wide networks gather data about such diverse subjects as atmospheric conditions, crop production, and airline traffic. These networks evolved as independent entities without the ability, or, until recently, the need, to interconnect with one another. New technologies, generically named "internetworking", have emerged making it possible to interconnect many disparate physical networks and make them function as a coordinated unit. Using internetworking technologies, a host, for example, on one network, may send data which traverses multiple networks to communicate with another host on a different network.

The size of an "internet", or group of interconnected networks, can vary quite significantly. For instance, the resulting network may be enormously large, such as the nation-wide DARPA (Defense Advanced Research Projects Agency)/NSF (National Science Foundation) Internet which connects most major research institutions, including universities, corporate and government labs. Conversely, the network may be relatively small, comprising only a single corporation's individual local area networks (LANs).

No matter the size of the network, it is clear that the task of effectively managing the resulting interconnected network is quite important and has been given a great deal of attention in the networking community. In managing a network, a network manager must keep track of the devices on the networks, monitor the network's performance and load, and diagnose and correct any problems.

Using presently available network management protocols such as SNMP (Simple Network Management Protocol) and CMIP (Common Management Information Protocol), network administrators (via "Managers") can address queries and commands to managed network nodes and devices (via "Agents") as the means of communication for managing the network.

FIG. 1 illustrates a simplified network having four interconnected nodes, Node 1, Node 2, Node 3 and Node 4. The nodes are logically interconnected by transmission groups (TGs). As can be seen, Node 1 is connected to Node 2 by TG A, Node 1 to Node 4 by TG E, and so forth. Each node is a managed network device and has an Agent for keeping management data and for communicating with the Manager, which is logically connected to each Agent.

The Manager is responsible for, among other things, monitoring network performance and status, controlling operational parameters, and reporting, analyzing and isolating faults in its managed domain. Furthermore, the Manager must maintain accounting data of the activity in its managed domain for customer billing, performance analysis, capacity planning and problem determination. In order to effectively accomplish these functions, the Manager requires precise and timely accounting data, including data related to time, regarding the network activity from the nodes in the network. In particular, there are many types of data in which an accurate TIME record is required. For example, in order for a network administrator to accurately bill a customer for the customer's network usage, the network administrator must know the length of time that the customer used the network as well as the time of day (and day of the week), i.e., calendar time, as usage rates may vary accordingly.

Few solutions for accurately recording times of events are available. For instance, in many systems, the Agents do not maintain the calendar time for the locale in which they reside. Instead, the Agents record the timing of events using "timeticks". Timeticks are cumulative units of time, e.g., hundredths of a second, since a specified point in time, normally since the Agent's clock began running. The use of timeticks is useful where elapsed time between events is desired. However, there is no precise manner of determining calendar time as there is no known reference point with which to correlate the elapsed time. In this case, the Manager must make a "best guess" as to the Agent's actual calendar time. Obviously, the accuracy of the times provided by this approach are highly questionable.

In other systems, Agents collect accounting data based upon local calendar time. In these systems, problems may occur where the Agent's calendar time is quite different than the Manager's calendar time at the outset. Some of these problems may be solved by synchronizing all the clocks in the system. However, the synchronization of clocks across all devices in a network is normally expensive and not feasible in many environments. Furthermore, each Agent's clock may be locally adjusted (such as for a bi-yearly time change) without the knowledge of the Manager so that compensation may be made. In this case, both the actual calendar time and the elapsed time between events would be affected.

In summary, presently, there is no method or system which a Manager may obtain accurate calendar time data from its Agents that have independent clocks on a consistent basis.

SUMMARY OF THE INVENTION

A new system and method allow one or more Managers in a network to obtain accurate and relative time data for accounting purposes. The system and method comprise the provision and use of three types of data objects in each of the Agent's stored records, "Record Number", "Recording time" and "Record Type". Record Number is the sequence number of the record in the file, the first record having a Record Number of "0", the second a Record Number of "1", and so forth. Recording time is an indication of the time the record was stored in the file and is the number of "timeticks" (one-hundredths of a second, for example) since a certain point in time, such as after the Agent's clock began running. Record Type is the particular type of record stored. The Record Type can either be DATA (comprising the normal accounting data) or TIME (comprising time data used for correlating the Manager's and the Agent's time-keeping). Upon receipt of a normal accounting data record (one having a Record Type of DATA), the Manager uses the received accounting data record's Recording time to help determine the point of time accorded to that event. The Manager uses the previous record having a Record Type of TIME to adjust the Recording time of the received accounting data record to the precise Manager's calendar time. In this manner, all accounting data received by the Manager can be adjusted so that it is relative to the Manager's calendar time.

BRIEF DESCRIPTION OF THE DRAWINGS

While the technical description concludes with claims particularly pointing out and distinctly claiming that which is regarded as the invention, details of a preferred embodiment of the invention may be more readily ascertained from the following technical description when read in conjunction with the accompanying drawings, where:

FIG. 2 illustrates an example of the contents of a TIME record as recorded by an Agent of the system of the present invention.

DETAILED DESCRIPTION OF THE PREFERRED EMBODIMENT

Figure 1:
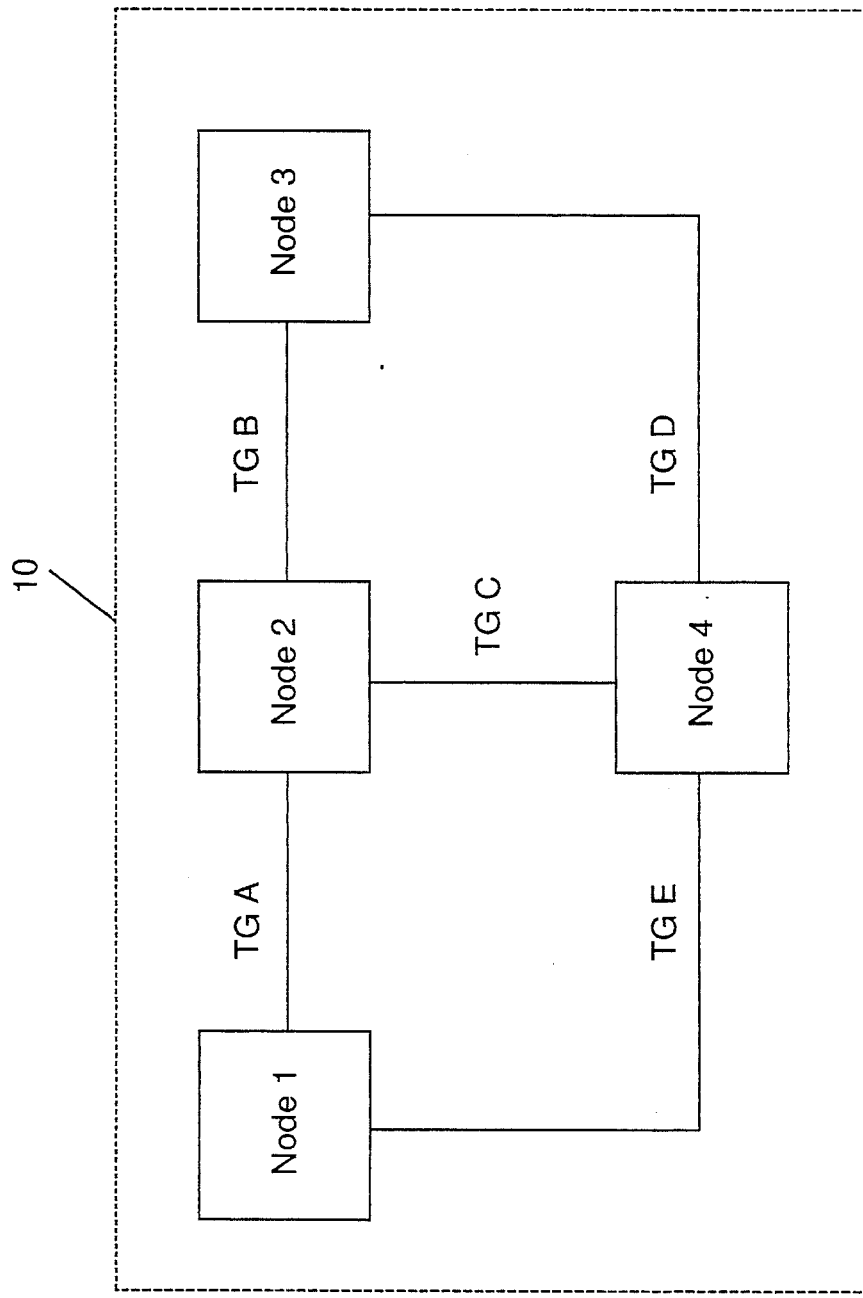
FIG. 1 is a block diagram of a representative communications network within which the present invention may be practiced.

The method and system of the present invention may be utilized in any network having management functionality. In the preferred embodiment, the invention is described in terms of a network conforming to the Simple Network Management Protocol (SNMP). In such a network, an SNMP Manager can address queries and commands to Agents responsible for monitoring network nodes and devices. The Manager monitors network performance and status; controls operational parameters; and reports, analyzes and isolates faults in its managed domain. The Manager must keep an accounting of these and other activities and does so by regularly querying its Agents.

Using the method and system of the present invention, the Manager may retrieve and record accurate accounting times by specifying its calendar time to the Agent and by correlating the Agent timeticks to the Manager time. The Manager has this ability through the provision and use of two types of accounting records—DATA records and TIME records. A DATA record is a normal record stored in a file (or set) of accounting records relating to the activity that the Agent is recording. For example, a DATA record may contain information relating to a particular session between two workstations in the network. A TIME record, by contrast, is a record used solely for specifying a Manager's calendar time to the Agent and for correlating the Agent's time or a TIME recorded in a record with the Manager's.

DATA records and TIME records contain three common attributes: a record type field, a record number field and a recording time field. The record type field merely indicates the type of record, i.e., DATA or TIME, enumerated by a single integer. The record number field is for the sequence number, as designated by the Agent, of the record. Record numbers are incremental and normally begin with "zero". The recording time field is for an integer representing the cumulative time since some point in time—normally since the Agent was started. This may be referred to as "TimeTicks". TimeTicks may be of any measure of time but normally are in hundredths of seconds.

In addition to the three common fields, DATA records and TIME records have fields for other information. For example, a DATA record may contain information relating to a particular session between two workstations, while a TIME record contains time information for use by the Manager in correlating received DATA records from the Agent in terms of the Manager's time.

An example of a file (or set) of records collected by an Agent is shown below in Table 1. Only the three fields common between DATA and TIME records are shown.

TABLE 1

| FILE OF RECORDS | | | |
| --- | --- | --- | --- |
| Record Number | Record Type | Recording time | Record Info. |
| 00000 | TIME | 000021 | XXXX |
| 00001 | TIME | 000024 | XXXX |
| 00002 | DATA | 000030 | XXXX |
| 00003 | DATA | 000035 | XXXX |
| 00004 | DATA | 000046 | XXXX |
| 00005 | TIME | 000050 | XXXX |
| 00006 | DATA | 000053 | XXXX |
| 00007 | DATA | 000064 | XXXX |

As can be seen in the file of records illustrated in Table 1, each individual record has a unique record number, in this case, beginning at zero and increasing by one as records collected by the Agent and stored by the Agent in an accounting file. Each record is either a normal DATA record, as indicated by the DATA in the Record Type field, or a TIME record, as indicated by the TIME in the Record Type field. The integer in the Recording time field is the cumulative number of TimeTicks after the Agent was started that the record was recorded. As was indicated, TimeTicks are normally hundredths of seconds. Other data (indicated by XXXX) is in the Record Info. field.

FIG. 2 illustrates an example of the contents of a TIME record 11 (Record Number 00000 of Table 1) as recorded by an Agent of the system of the present invention. As discussed above, TIME record 11 comprises common attributes Record Number, Record Type, and Recording time.

In addition, TIME record 11 consists of Record Info. 12 consisting of "Other Attributes" consisting of Record Sub Type of "RecordEvent—Accounting Started" indicating that the Manager desires the Agent start collecting data and Unit of TimeTick—hundredths of a second. Other possible Record Sub Types are "RecordEvent—Manager Set Time" indicating that the record is for setting the Manager's calendar time and "RecordEvent—Agent Calendar Time Changed" indicating that the Agent's calendar time has been changed (due to, for example, day light savings). The TimeTick units may be any unit of time such as seconds or milliseconds.

In this TIME record, the Agent's name is "AGENT_NAME1" while the Manager's name is "MANAGER_NAME1". Record Info. 12 further has the Agent's and the Manager's respective calendar time in seconds, minutes, hours, month days, months, years and time zone information. It should be noted that the RecordingTime (0000021) is denoted in TimeTicks while the remaining time data (i.e., the Agent's and the Manager's calendar time) is denoted in calendar time in one form or another. Finally, Record Info. 12 has a ManagerTimeValid field which may be set to "YES" (indicating that the Manager has validated the TIME record) or "NO" (indicating the contrary) by the Manager.

In operation, the Manager retrieves from an Agent a specified file of records. This can be accomplished through a file transfer routine or on a record-by-record basis. The retrieved file consists of both data and TIME records and has, for the first record of the file, a TIME record so that all subsequent records may be correlated with respect to their time data as will be discussed.

From the DATA records, the Manager is able to retrieve the relevant information it requires. For example, the information may be related to a particular session, such as session type, session start time, etc. Each DATA record also has a recording time in timeticks as discussed above. The TIME records contain information relating to the Manager's and the Agent's relative calendar time as well as having a recording time in timeticks. From the TIME records, the Manager is able to correlate the time specified in the DATA records with its own actual calendar time. It is in this manner that the Manager is able to maintain accurate time data objects.

Figure 3A:
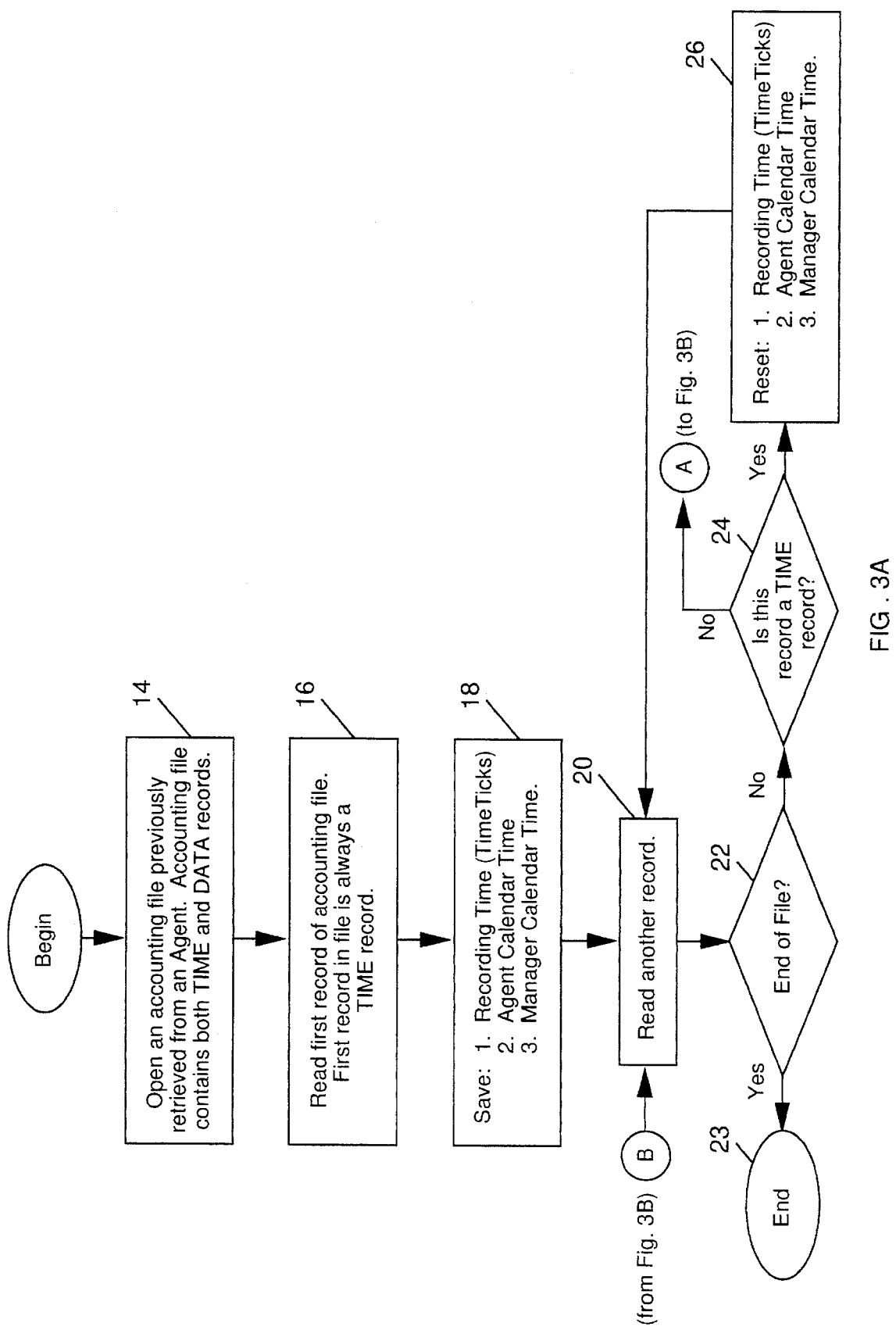
FIGS. 3A and 3B illustrate in flow chart form the method of correlating event times of data records received by a Manager from an Agent to the Manager's or Agent's calendar times.
Figure 3B:
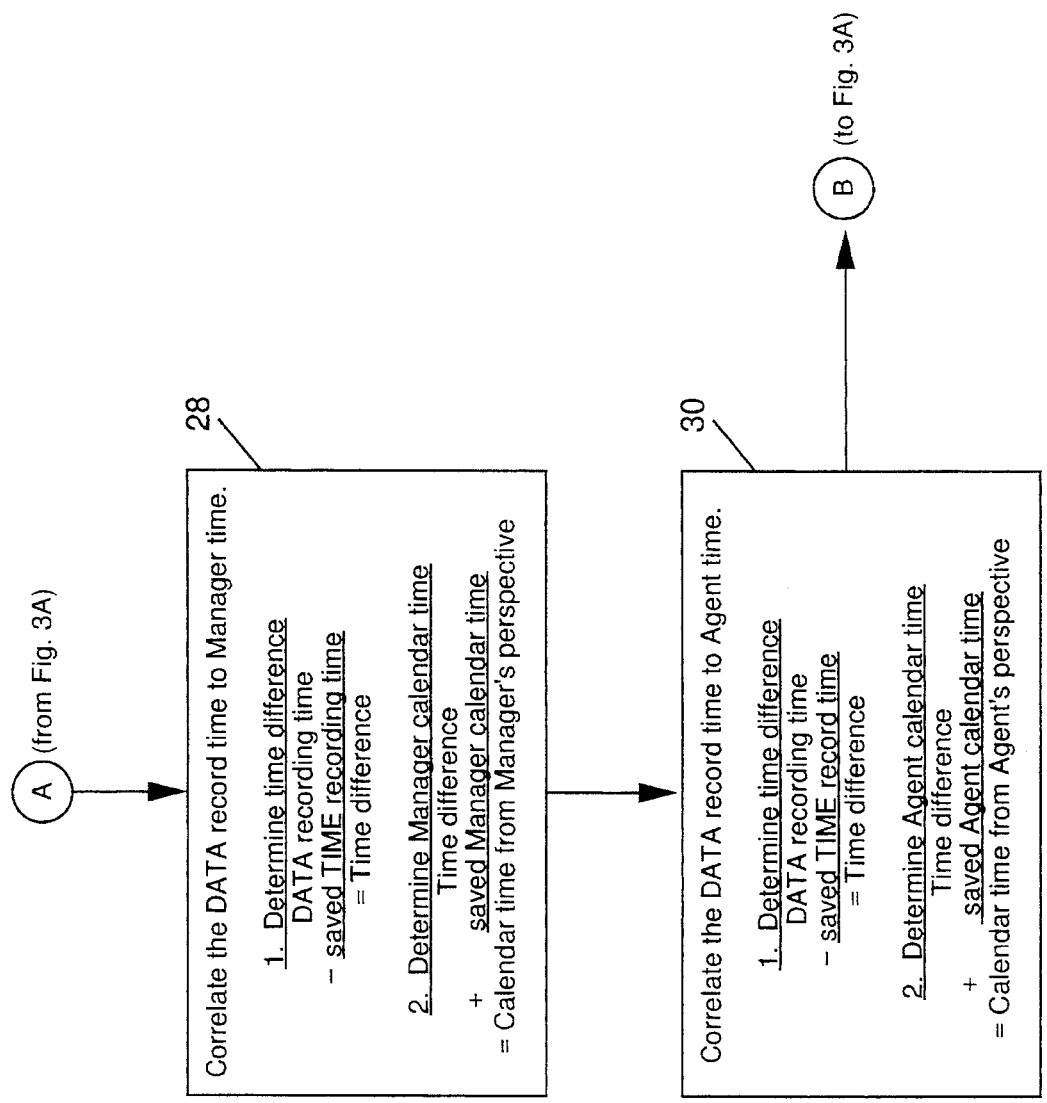

FIGS. 3A and 3B illustrate, in block diagram form, the method in which a Manager may correlate the time in the received records from the Agent to its own calendar time. At 14, the Manager opens an accounting file previously retrieved from an Agent. At 16, the Manager reads the first record of the file—always a TIME record. At 18, the Manager saves, for correlating the subsequent files, the information stored in the RecordingTime field (number of TimeTicks), the Agent calendar time, and the Manager calendar time (if it has been validated). At 20, the Manager attempts to read another record from the file. If, at 22, there are no more records for the Manager to read (i.e., it is the end of the file), the Manager has completed its correlation routine (23). Obviously, most times there will be more than a single TIME record in the file so that tile cycle beginning at 20 is performed more than just the initial time.

If there is another record to read, i.e., it is not the end of the file at 22, the Manager determines the record type at 24 by examining the RecordType field of the record. If it is a TIME record, the Manager, at 26, resets the RecordingTime (TimeTicks), the Agent calendar time and the Manger calendar time (if it has been validated) which it previously saved at 18. The Manager then attempts to read the next record at 20.

If, at 24, the record is not a TIME record but a DATA record, instead, the Manager correlates the recording time as recorded in the DATA record to the Manager calendar time (at 28 in FIG. 3B). In order to correlate the DATA recording time with the Manager's calendar time, the Manager needs to determine (1) the time difference between the saved recording time of the TIME record (of step 18 or 26) and the DATA recording time and, then, (2) the Manager calendar time. The Manager calendar time is calculated by using the time difference and the Manager calendar time from the saved TIME record of step 18 or 26.

At 30, the Manager correlates the recording time as recorded in the DATA record to the Agent calendar time. Similar to the method described above for correlation to Manager calendar time, in order to correlate the DATA recording time with the Agent's calendar time, the Manager needs to determine (1) the time difference between the saved recording time of the TIME record (of step 18 or 26) and the DATA recording time (or, alternatively, use the time difference calculated in step 28) and, then, (2) the Agent calendar time. The time difference is calculated as discussed above. The Agent calendar time is calculated by using the time difference with the saved Agent calendar time.

Figure 4A:
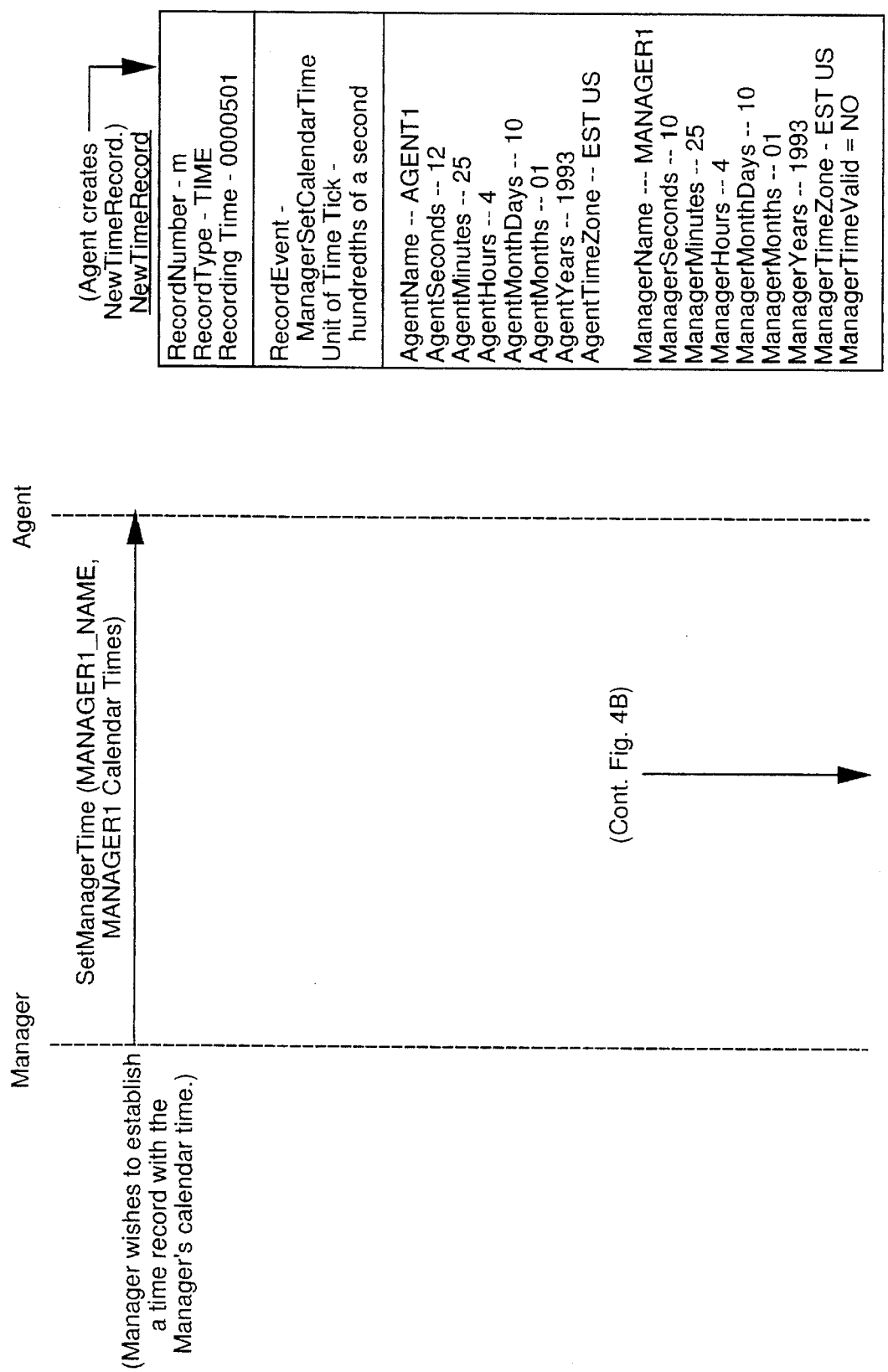
FIGS. 4A and 4B illustrate the message flows between a Manager and an Agent during the setting of a TIME record in the Agent.
Figure 4B:
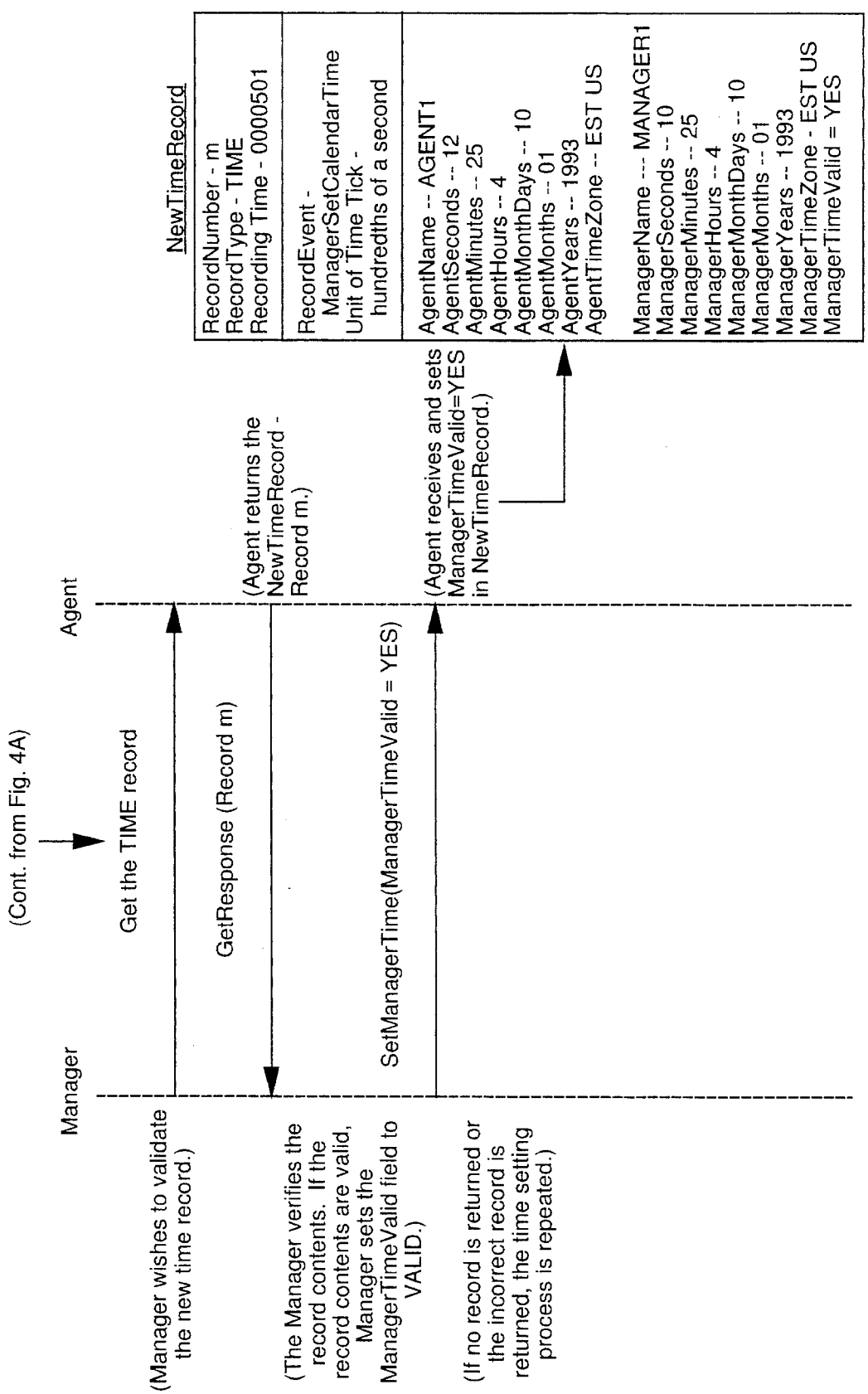

In order to use the method described above, a TIME record having the Manager's calendar time must be initially set in the Agent by the Manager. FIGS. 4A and 4B illustrate the setting of a TIME record in an Agent. The Manager establishes a NewTimeRecord by sending to the Agent the Manager's name (MANAGER1) and the Manager's calendar times (e.g., 1993/1/10, 4:25:10). The Agent receives this data, establishes a NewTimeRecord having a record number of m, with a record type of TIME at RecordingTime 0000501 (at 501 Agent TimeTicks with a Record Sub Type "RecordEvent—Manager Set Time). This TIME record contains the Manager's calendar time as received from the Manager as well as the Agent's calendar time, if the Agent maintains calendar time, at the time it was created. In this case, the Agent's calendar time two seconds later than the Manager's as that is the amount of time taken for this sample transaction to occur. Record m also contains the field ManagerTimeValid which is set NO, indicating that the TIME record has not been validated by the Manager.

As shown in FIG. 4B, the Manager retrieves the NewTimeRecord (e.g., using SNMP GetNextRequests to ask the Agent to send the TIME records). The Agent responds with Record m, which in this case is the NewTimeRecord. The Manager verifies the contents of the TIME record in order to determine that no errors have occurred in transmitting the data and the like (e.g., the delay is unacceptable). Where the data is confirmed by the Manager, the Manager issues a command to the Agent to set the ManagerTimeValid of the NewTimeRecord to YES, as shown in the figure.

Figure 5:
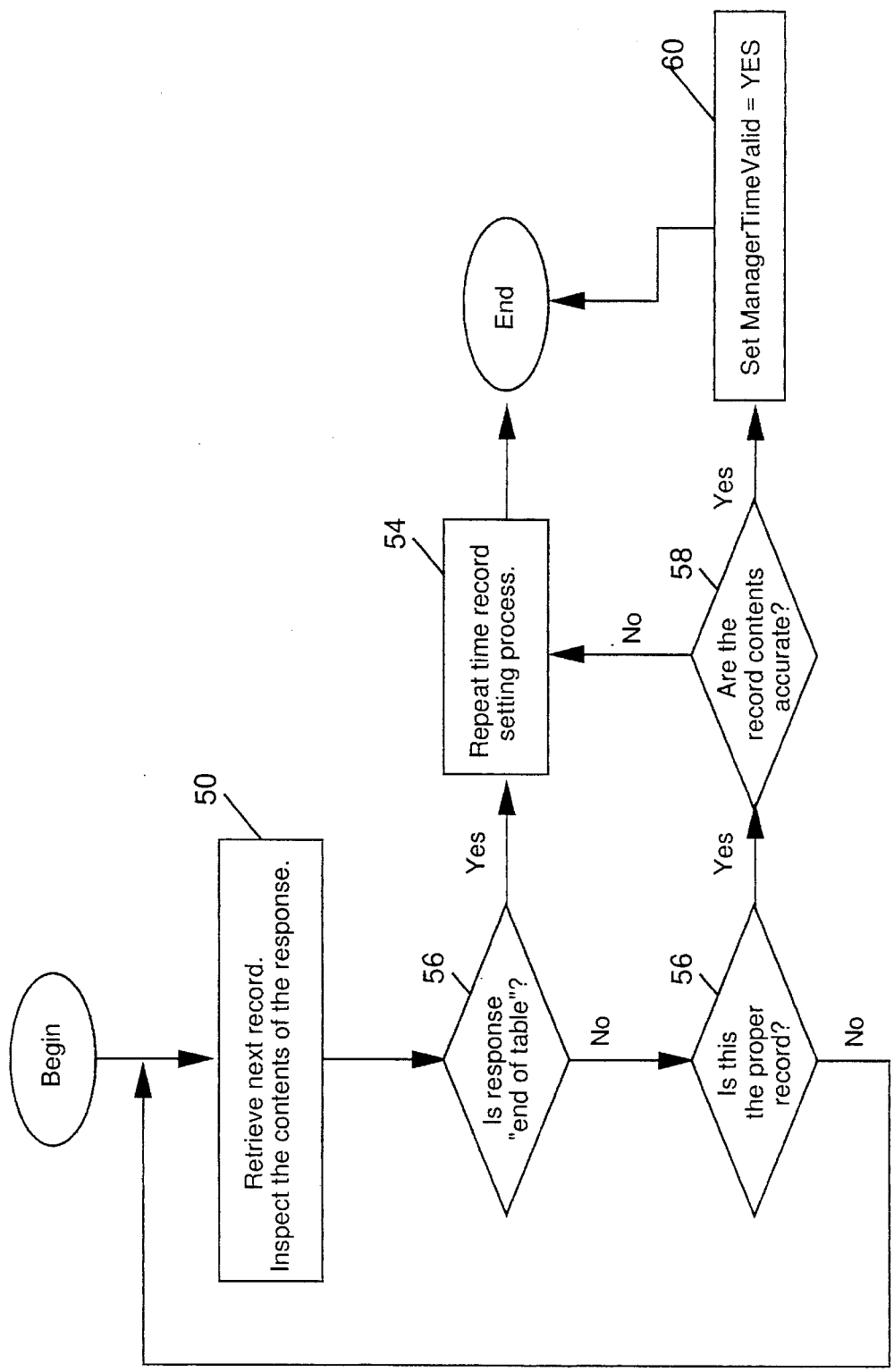
FIG. 5 illustrates a flow chart of the actions performed by the Manager for confirming the contents of the NewTimeRecord.

FIG. 5 illustrates a flow chart of the actions, using the SNMP technique, performed by the Manager for confirming the contents of the NewTimeRecord and verifying the delay. Initially, at 50, the Manager retrieves the next record (after the newest Record n). At 50, the Manager inspects the contents of the Agent's response. If, at 52, the response is a "end of table" response (or a "noSuchName" response in SNMP), indicating that the Agent has no more records, the Manager must repeat, at 54, the TIME record setting process as discussed above and as shown in FIGS. 4A and 4B. If, at 56, a proper record is received, i.e., a TIME record having the Manager's name (MANAGER1) in the ManagerName field, the Manager inspects, at 58, the record contents. If the data is not confirmed, the Manager repeats the process at 54. If, at 58, the record contents are confirmed, the Manager, at 60, sets the ManagerTimeValid field of the TIME record to YES. If, at 56, an improper record is received by the Manager, e.g., where it is another Manager's TIME record or the contents are not accurate, the Manager (MANAGER1) retrieves the next record, by issuing a GetNextRequest command. This process is continued until the correct record is received or a noSuchName response is received from the Agent.

In the event that the Agent's calendar time is changed, the timeticks will not be affected. A new TIME record with a Record Sub Type of "RecordEvent—Agent Calendar Time Changed" will be created. Thus, the elapsed time between any two DATA records can still be accurately obtained from the difference of timeticks, and the Agent calendar time for a DATA record may be derived accurately.

Thus, it can be seen that the method and system of the present invention allows a Manager to retrieve accurate time data from its Agents on a consistent basis. Through the use of data- and time-type records, all accounting data received by the Manager can be adjusted so that it is relative to the Manager's calendar time. While the invention has been particularly shown and described with reference to preferred embodiments thereof, it will be understood by those skilled in the art that various other changes in form and detail may be made without departing from the spirit and scope of the invention.

What is claimed is:

1. For use in a Manager of a network comprising at least one Agent for collecting a plurality of records of data, said Manager having a Manager system clock for timekeeping purposes, said at least one Agent having an Agent system clock for time-keeping purposes, each record having Agent recording time data representing the time the record was collected by said Agent and being based upon a reading by said Agent of said Agent system clock, at least one of said records having Manager calendar time data representing the Manager's calendar time, said Manager calendar time being based upon a reading by said Manager of said Manager system clock, a method of correlating Agent recording time data with Manager calendar time data comprising the steps of;

a) retrieving from said Agent a first record having Agent recording time data and Manager calendar time data;

b) retrieving from said Agent a second record having Agent recording time data; and c) correlating the Agent recording time data of said second record with the Manager calendar time data of said first record using said Agent recording time data and said Manager calendar time data from said retrieved first record and using said Agent recording time data from said retrieved second record, said correlating step comprising the steps of calculating the difference of the Agent recording time data of said first record and the Agent recording time data of said second record and adding said difference to the Manager calendar time data of said first record to obtain the calendar time at the Agent in the Manager's perspective.

2. The method defined in claim 1 further comprising, after step a), the step of storing said Manager calendar time data.

3. The method as defined in claim 1 wherein step b) further comprises the steps of b1) examining said second record, b2) determining whether said second record has Manager calendar time data, and, if so, step b3) storing said Manager calendar time data, step b4) retrieving a subsequent record, b5) examining said subsequent record, b6) determining whether said subsequent record has Manager calendar time data and, if so, repeating steps b3) through b6) until a subsequent record does not have Manager calendar time data.

4. The method as defined in claim 1 wherein said retrieving steps a) and b) each comprise said Manager issuing at least one command to said Agent, said at least one command conforming to the Simple Network Management Protocol (SNMP).

5. For use in a Manager of a network comprising at least one Agent for collecting a plurality of records of data, said Manager having a Manager system clock for timekeeping purposes, said at least one Agent having an Agent system clock for time-keeping purposes, each record having Agent recording time data representing the time the record was collected by said Agent and being based upon a reading by said Agent of said Agent system record, Agent recording time data representing the time the record was collected by said Agent, said Agent recording time data being based upon a reading by said Agent of said Agent system clock, said Agent further storing, in at least one of said records, Manager calendar time data representing the Manager's calendar time, said Manager calendar time data being based upon a reading by said Manager of said Manager system clock;

said Manager having means for retrieving from said Agent a first record having Agent recording time data and Manager calendar time data, means for retrieving from said Agent a second record having Agent recording time data, and means for correlating the Agent recording time data of said second record with said Manager calendar time data of said first record, using said Agent recording time data and said Manager calendar time data from said retrieved first record and using said Agent recording time data from said retrieved second record, said correlating means comprising means for calculating the difference of the Agent recording time data of said first record and the Agent recording time data of said second record and means for adding said difference to the Manager calendar time data of said first record to obtain the calendar time at the Agent in the Manager's perspective.

6. The method as defined in claim 5 wherein step c) comprises the steps of calculating the difference of the Agent recording time data of said first record and the Agent recording time data of said second record and adding said difference to the Agent calendar time data of said first record to obtain the calendar time at the Agent in the Agent's perspective.

7. The method as defined in claim 5 further comprising, after step a), the step of storing said Agent calendar time data.

8. The method as defined in claim 5 wherein step b) further comprises the steps of b1) examining said second record, b2) determining whether said second record has Agent calendar time data, and, if so, step b3) storing said Agent calendar time data, step b4) retrieving a subsequent record, b5) examining said subsequent record, b6) determining whether said subsequent record has Agent calendar time data and, if so, repeating steps b3) through b6) until a subsequent record does not have Agent calendar time data.

9. The method as defined in claim 5 wherein said retrieving steps a) and b) each comprise said Manager issuing at least one command to said Agent, said at least one command conforming to the Simple Network Management Protocol (SNMP).

10. A network comprising:

at least one Manager having a Manager system clock for timekeeping purposes; and at least one Agent for collecting and storing a plurality of records of data, said at least one Agent having an Agent system clock for time-keeping purposes, said Agent storing, in each record, Agent recording time data representing the time the record was collected by said Agent, said Agent recording time data being based upon a reading by said Agent of said Agent system clock, said Agent further storing, in at least one of said records, Manager calendar time data representing the Manager's calendar time, said Manager calendar time data being based upon a reading by said Manager of said Manager system clock;

said Manager having means for retrieving from said Agent a first record having Agent recording time data and Manager calendar time data, means for retrieving from said Agent a second record having Agent recording time data, and means for correlating the Agent recording time data of said second record with said Manager calendar time data of said first record, using said Agent recording time data and said Manager calendar time data from said retrieved first record and using said Agent recording time data from said retrieved second record.

11. The network as defined in claim 10 wherein said Manager further comprises means for storing said Manager calendar time data.

12. The network as defined in claim 10 wherein said correlating means comprises means for examining said second record, means for determining whether said second record has Manager calendar time data, and, if said second record has Manager calendar time data, means for storing said Manager calendar time data, means for retrieving a subsequent record, means for examining said subsequent record, means for determining whether said subsequent record has Manager calendar time data and means for storing said Manager calendar time data if said subsequent record has Manager calendar time data.

13. A Manager for use in a network comprising at least one Agent for collecting a plurality of records of data, said Manager having a Manager system clock for timekeeping purposes, said at least one Agent having an Agent system clock for time-keeping purposes, each record having an Agent recording time data representing the time the record was collected by said Agent and being based upon a reading by said Agent of said Agent system clock, at least one of said records having Manager calendar time data representing the Manager's calendar time, said Manager calendar time being based upon a reading by said Manager of said Manager system clock, said Manager comprising:

means for retrieving from said Agent a first record having Agent recording time data and Manager calendar time data;

means for retrieving from said Agent a second record having Agent recording time data; and means for correlating the recording time data of said second record with said Manager calendar time data of said first record using said Agent recording time data and said Manager calendar time data from said retrieved first record and using said Agent recording time data from said retrieved second record, said correlating means comprising means for calculating the difference between the Agent recording time data of said first record and the Agent recording time data of said second record and means for adding said difference to the Manager calendar time data of said first record to obtain the calendar time at the Agent in the Agent's perspective.

14. The Manager as defined in claim 13 further comprising means for storing said Manager calendar time data.

15. The Manager as defined in claim 14 wherein said correlating means comprises means for examining said second record, means for determining whether said second record has Manager calendar time data, and, if said second record has Manager calendar time data, means for storing said Manager calendar time data, means for retrieving a subsequent record, means for examining said subsequent record, means for determining whether said subsequent record has Manager calendar time data and means for storing said Manager calendar time data if said subsequent record has Manager calendar time data.

16. The Manager as defined in claim 13 further comprising means for sending, to said Agent, said Manager's calendar time, means for sending, to said Agent, a command to record said Manager's calendar time in a time record, means for retrieving a first record from said Agent, means for examining said first record to determine whether said first record is said time record, means for examining the contents of said time record to determine whether it contains data accurately depicting said Manager's calendar time if said first record is said time record and means for validating said time record if said time record contains accurate Manager's calendar time data.

17. The Manager as defined in claim 16 further comprising means for retrieving a subsequent record if said first record is not said time record, means for examining said subsequent record to determine whether said subsequent record is said time record, means for examining the contents of said time record to determine whether it contains data accurately depicting said Manager's calendar time if said subsequent record is said time record.

18. A Manager for use in a network comprising at least one Agent for collecting a plurality of records of data, said Manager having a Manager system clock for timekeeping purposes, said at least one Agent having an Agent system clock for time-keeping purposes, each record having Agent recording time data representing the time the record was collected by said Agent and being based upon a reading by said Agent of said Agent system clock, at least one of said records having Agent calendar time data representing the Agent's calendar time and being based upon a reading by said Agent of said Agent system clock, said Manager comprising:

means for retrieving from said Agent a first record having Agent recording time data and Agent calendar time data;

means for retrieving from said Agent a second record having Agent recording time data; and means for correlating the recording time data of said second record with said Agent calendar time data of said first record using said Agent recording time data and said Agent calendar time data from said retrieved first record and using Agent recording time data from said retrieved second record, said correlating means comprising means for calculating the difference between the Agent recording time data of said first record and the Agent recording time data of said second record and means for adding said difference to the Agent calendar time data of said first record to obtain the calendar time at the Agent in the Agent's perspective.

19. The Manager as defined in claim 18 further comprising means for storing said Agent calendar time data.

20. The Manager as defined in claim 18 wherein said correlating means comprises means for examining said second record, means for determining whether said second record has Agent calendar time data, and, if said second record has Agent calendar time data, means for storing said Agent calendar time data, means for retrieving a subsequent record, means for examining said subsequent record, means for determining whether said subsequent record has Agent calendar time data and means for storing said Agent calendar time data if said subsequent record has Agent calendar time data.

21. The Manager as defined in claim 18 wherein said retrieving means each comprise means for issuing at least one command to said Agent, said at least one command conforming to the Simple Network Management Protocol (SNMP).

22. For use in a Manager of a network comprising at least one Agent for collecting a plurality of records of data, said Manager having a Manager system clock for timekeeping purposes, said at least one Agent having an Agent system clock for time-keeping purposes, a method of setting, in a record, the Manager's calendar time, said Manager calendar time being based upon a reading by said Manager of said Manager system clock, comprising the steps of:

a) sending, to said Agent, said Manager's calendar time;

b) sending, to said Agent, a command to record said Manager's calendar time in a time record;

c) retrieving a first record from said Agent;

d) examining said first record to determine whether said first record is said time record;

e) if said first record is said time record, examining the contents of said time record to determine whether it contains data accurately depicting said Manager's calendar time;

f) if said first record is not said time record, retrieving a subsequent record;

g) examining said subsequent record to determine whether said subsequent record is said time record;

h) if said subsequent record is said time record, examining the contents of said time record to determine whether it contains data accurately depicting said Manager's calendar time; and i) if said time record contains accurate Manager's calendar time data, validating said time record.

23. The method as defined in claim 22 wherein step f) further comprises the steps of f1) if said time record contains inaccurate Manager's calendar time data, repeating steps a) through f).

\* \* \* \* \*